(12) United States Patent
Pang et al.

(10) Patent No.: US 6,493,810 B1
(45) Date of Patent: Dec. 10, 2002

(54) METHOD AND SYSTEM FOR ALLOCATING CACHE MEMORY FOR A NETWORK DATABASE SERVICE

(75) Inventors: Jee Fung Pang, Woodinville, WA (US); Melur K. Raghuraman, Redmond, WA (US); Yong Chiang Tay, Singapore (SG)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/560,804

(22) Filed: Apr. 28, 2000

(51) Int. Cl.[7] .............................................. G06F 12/00
(52) U.S. Cl. ...................... 711/170; 711/130; 711/147
(58) Field of Search ................................ 711/170, 171, 711/100, 118, 129, 134, 130; 707/501.1

(56) References Cited

U.S. PATENT DOCUMENTS

| | | | | |
|---|---|---|---|---|
| 5,590,308 A | * | 12/1996 | Shih ........................... | 711/130 |
| 5,802,600 A | * | 9/1998 | Smith et al. ................ | 711/129 |
| 5,835,928 A | * | 11/1998 | Auslander et al. .......... | 711/100 |
| 6,098,152 A | * | 8/2000 | Mounes-Toussi ........... | 711/134 |
| 6,154,767 A | * | 11/2000 | Altschuler et al. ........ | 707/501.1 |
| 6,282,613 B1 | * | 8/2001 | Hsu et al. ................... | 711/118 |

OTHER PUBLICATIONS

Sari L. Coumeri and Donald E. Thomas, "Memory Modeling for systems synthesis"; Proceedings 1998 International Symposium on Low Power Electronics and Design, 1998, pp. 179–184.

Voelker, GM et al., "Managing Server Load in Global Memory Systems", Jun. 1997, Performance Evaluation Review 25(1): 127–138.

"A Probabilistic Method for Calculating Hit Ratios in Direct Mapped Caches", Jul. 1996, Journal of Network and Computer Applications, vol. 19 No. 3 pp. 309–19.

* cited by examiner

Primary Examiner—Matthew Kim
Assistant Examiner—Brian R. Peugh
(74) Attorney, Agent, or Firm—Leydig, Voit & Mayer, Ltd.

(57) ABSTRACT

A method is provided for estimating the size of cache memory required for optimal performance of a network database service, such as a directory service, by means of an iterative process. In the estimation process, the memory size N for best-case performance (i.e., the memory size that avoids any disk I/O operation) is first determined. The allocated memory size is then given a starting value. The probability (p) of cache-miss is then estimated for that memory size. Another probability (q), which is the probability that a record requested by a frequent user of the service is not in the cache, is also estimated for the memory size. The performance impact of the disk I/O rate indicated by p and q is then evaluated. If the performance is not adequate, the cache memory size is adjusted to a different value. The miss probabilities p and q are again estimated, and the performance impact is estimated. This iterative process is continued until the cache memory size is found to provide adequate estimated performance.

8 Claims, 5 Drawing Sheets

METHOD AND SYSTEM FOR ALLOCATING CACHE MEMORY FOR A NETWORK DATABASE SERVICE

TECHNICAL FIELD OF THE INVENTION

This invention relates generally to capacity planning for computer systems, and more particularly to the allocation of cache memory for a network database service, such as a directory service.

BACKGROUND OF THE INVENTION

A computer system typically has limited resources, such as random-access memory (RAM), storage disk space, processing speed, communication bandwidth, etc. Moreover, at any given time, the system resources may have to be shared by multiple applications. To ensure the most efficient use of the system resources, an application should be allowed to occupy only as much system resources as necessary for it to accomplish its tasks with acceptable performance. Allocating too much resources to an application not only results in a waste of valuable resources but also may interfere with the needs of other applications for the resources. On the other hand, not giving an application sufficient system resources can significantly hinder its operation, resulting in unacceptably poor performance.

It is therefore important to give careful considerations to how much resources should be allocated for various applications in a computer system. The process of estimating the resource requirements that meet the business objectives of a computer system, commonly referred to as "capacity planning," typically involves the prediction of CPU, I/O, memory and network resources required for a given set of application profiles. Predicting the computing resource requirements based on application profiles is central to the process of capacity planning.

In particular, predicting the memory requirements of an application for optimal performance has been a long-standing problem. Computer memory is one of the most fundamental types of system resources. Many applications require a large amount of memory to achieve adequate performance. For instance, network database services, such as directory services, often require a significant amount of memory for use as a cache for storing entries retrieved in response to database queries. Caching the query results is necessary to ensure adequate response performance of a directory service or the like, because the database is typically stored on a mass storage device, such as a disk, that is significantly slower in data retrieval than processor memory. If the clients of the network database service often make requests for the same databases entries, as in the case of a directory service, caching query results in the computer memory can avoid many slow disk I/O operations, thereby significantly enhancing the performance of the service.

As with any cache management problem, the focus is "cache miss," i.e., the instance that the requested entry cannot be found in the cache memory. In the event of a cache miss, the service must retrieve the entry from the disk. It is well known that in virtual memory based systems inadequate memory usually results in increased page faults and, as a result, increased disk operations. The question is how to determine the optimal amount of computer memory that is needed to keep the cache-miss rate acceptably low to ensure acceptable performance. Allocating as much memory as available for use as cache memory is obviously not a solution. Moreover, in some environments such as Internet service providers, there can be potentially millions of users, and it is neither possible nor advisable to fit all of their records in memory. How much cache memory is adequate for a network database service, such as a directory service, is often a quite complicated issue, and the answer may differ significantly from application to application.

In the past, a typical way to address the question of memory requirements is to provide empirical data of memory usage from selected typical environments and let the customer make their conclusions. This approach is obviously inadequate. Network applications such as a directory service operate under widely varying environments, including small businesses, Internet service providers (ISPs), and large enterprises. Each environment has its own operating conditions and performance requirements. Since the simple conventional approach cannot take those important differences into account, it is unlikely able to provide satisfactory estimates of the memory requirements. There have been several models to relate the memory size and the page faults proposed in the literature. Most of these memory estimation efforts, however, either require extensive operation information that cannot be realistically obtained, such as record reference strings or patterns, locality, etc., or are based on poor assumptions that are too generic to provide meaningful results. As a result, they are of limited usefulness for estimating the optimal cache memory size for a network database service such as a directory service.

SUMMARY OF THE INVENTION

In view of the foregoing, the present invention provides an effective method for estimating and allocating the amount of memory required for a network database service, such as a directory service, to provide optimal performance. The method in accordance with the invention involves an iterative process. In this process, the memory size N for best-case performance (i.e., the memory size that is sufficiently large to cache all query results for a peak number of users so as to avoid any disk I/O re-reading operations) is first estimated. The allocated cache memory size is then given a starting value. The probability (p) of cache-miss is then estimated for that memory size. Another probability (q), which is the probability that a record requested by a frequent user of the service is not in the cache, is also estimated for the memory size. The performance impact due to the disk I/O rate as determined by p and q is then evaluated, such as by analytic modeling or other performance modeling methods. If the performance is not adequate, the cache memory size is adjusted to a different value. The miss probabilities p and q are again estimated, the performance impact is evaluated, and the allocated cache size is again adjusted if the performance is still not adequate. This iterative process is continued until the adequate estimated performance is achieved.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
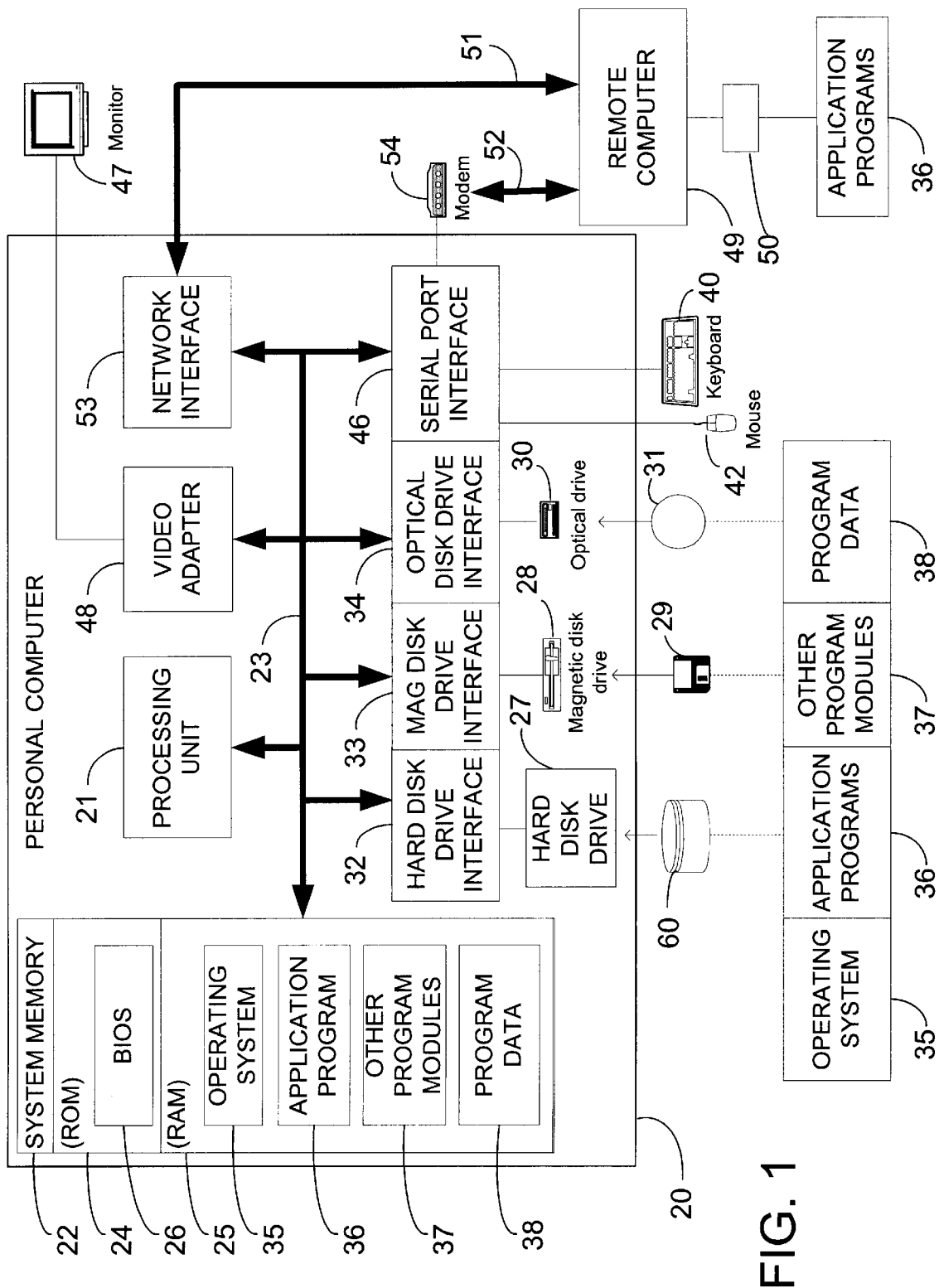
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device So has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
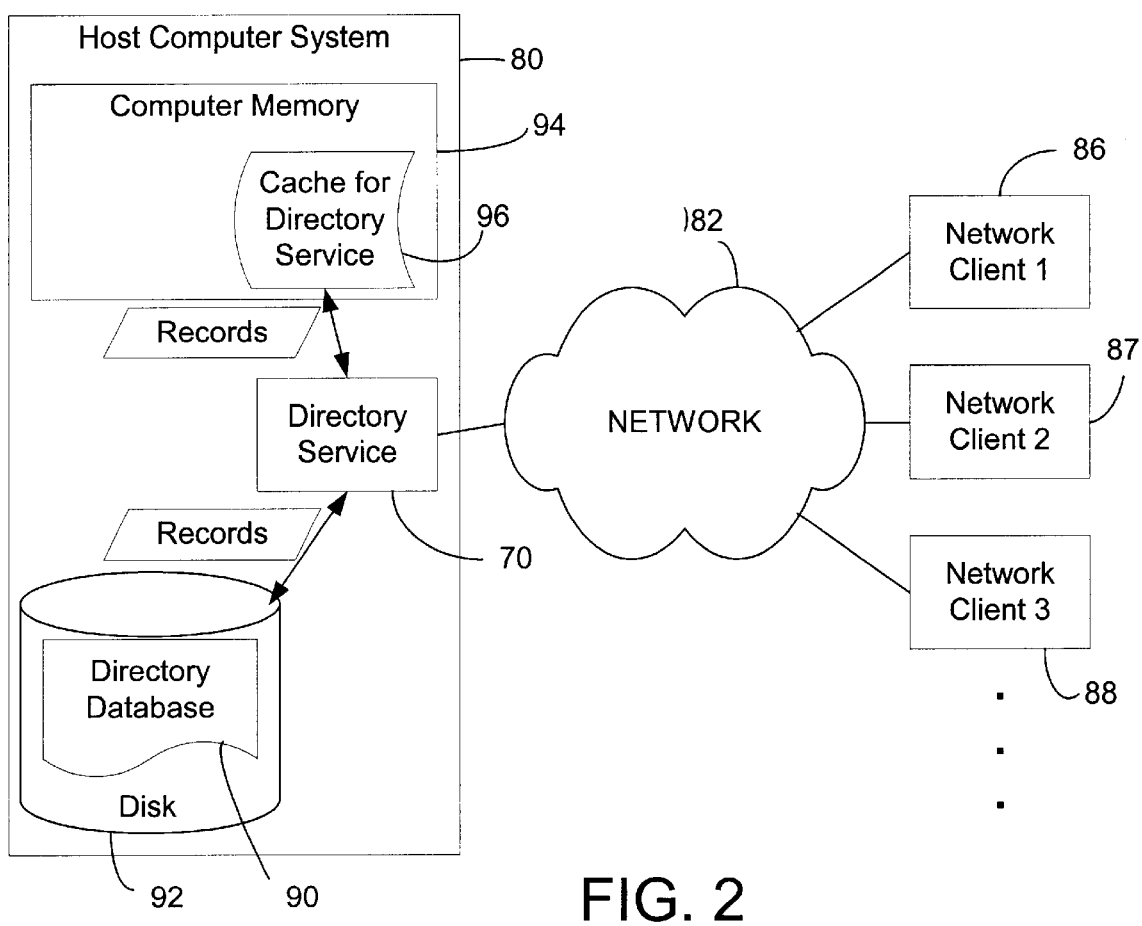
FIG. 2 is a schematic diagram showing a network system with a directory service that reduces disk I/O operations by caching entries retrieved from a directory database in response directory queries.

Referring now to FIG. 2, the present invention is directed to a way of estimating the size of cache memory needed for a network database service to provide adequate performance in responding to queries for information stored in its database. For illustration purposes, the invention will be described below in connection with a preferred embodiment in which the network database service is a directory service. It will be appreciated, however, that the process of estimating memory requirement in accordance with the invention is applicable to other network database services that have data retrieval characteristics similar to the directory service. Basically, to use a directory service, the user would need first to gain access to the service, typically by authenticating itself. On a subsequent request, the user may re-authenticate while it requests for other information from the directory service. For a frequent user, after the user has terminated its session with the directory service, it is highly likely that some of its previous information (e.g., authentication information) is still in the memory when it gains access for another session.

As shown in FIG. 2, the directory service 70 resides in a host computer system 80 that is part of a computer network 82 having a plurality of other computers, such as client computers 86–88. The directory service 70 functions as an information source for providing directory information pertaining to users and computers residing on the network 82. To support the function of providing directory information, the directory service maintains a directory database 90 that stores various types of directory information. The directory database 90 is stored on a mass storage medium of the host computer system, which in the illustrated embodiment is a hard disk 92. The directory database has multiple entries, each of which is a set of attributes for an entity. For example, a directory for a domain may contain an entry for each user and each device in the domain, and an attribute may be an e-mail address or an access control list.

A client, such as the computer 86, accesses the directory database by setting up a connection with the directory service 70, over which it issues multiple query operations on the directory. To process the directory access operations, the directory service 70 retrieves relevant entries and extracts appropriate information pertaining to the client, and sends the information through the network to the client.

As shown in FIG. 2, the directory service 70 has a portion of the computer memory 94 allocated to it for use as cache memory for caching the entries retrieved from the database stored on the disk. The cache memory 96 is provided because the disk I/O operation is typically orders of magnitudes slower than reading from the cache memory. If the entries requested in a directory query are already stored in the cache memory 96, the directory service 70 can obtain those entries from the cache memory, thereby avoiding one or more slow disk I/O operations. Since the client may query the same entries again, the server tries to cache the entries in the memory as long as the connection is open.

As stated above, the present invention provides a way to estimate how much memory space should be allocated to a network database service, such as the directory service 70, for caching purposes. As with any cache management problem, the focus is on minimizing "cache miss," i.e., minimizing the probability that the server must retrieve an entry from disk in response to a query, while ensuring acceptable performance. It is well known that in virtual memory based systems inadequate cache memory size usually results in increased page faults, which result in increased disk operations. In order to ensure good overall performance, it is necessary to estimate the memory requirement for each service. Due to the complex interaction between various subsystems in the operating system and the application caches (VM, I/O and Database cache), the determination of the optimal cache size is not a process amenable to straightforward analytical calculations.

In accordance with the present invention, the proper size of the cache memory for a network database service to achieve optimal performance is estimated by means of an iterative process that takes into account the work load of the service as well as the performance impact of a given cache memory size. More particularly, referring now to FIG. 3, the estimation process starts with estimating the memory size (N) for the best-case performance of the network database service (step 110). This best-case performance memory size N is defined as the amount of memory that potentially can cache all the database entries required for responding to queries from clients at peak operation so as to avoid any disk I/O operations once the entries have been loaded into the cache memory 96.

After the best-case performance memory size N is determined, the "allocated memory size" (C), i.e., the size of the cache memory to be allocated to the network service, is assigned a starting value (step 112). Note that the allocated memory size C is typically smaller than the best-case memory size N because the user population of the service is too large (as in the cases of Internet service providers) or because the computer memory has to be shared by multiple services (as in the case of small business environments).

With the present value of the allocated memory size C, the probability (p) of cache-miss is estimated (step 114). Another probability (q) that a record requested by a frequent user is not in the cache is also estimated (step 116). When a client requests for records from the directory service and the requested records are not in the cache memory, the service has to carry out I/O operations to bring the records from the disk to the cache memory for sending to the client. Thus, when a set of records is requested, the probability p will be the ratio of the expected number of records to be retrieved from the disk with respect to the total number of records requested. The probability q, in contrast, is the probability that a returning user will not find the records it needs in the cache memory. Based on the miss probabilities p and q determined in steps 114 and 116, the performance impact on the directory service due to the disk I/O rates are then evaluated (step 118). The performance impact may be evaluated, for example, by means of performance modeling.

Figure 3:
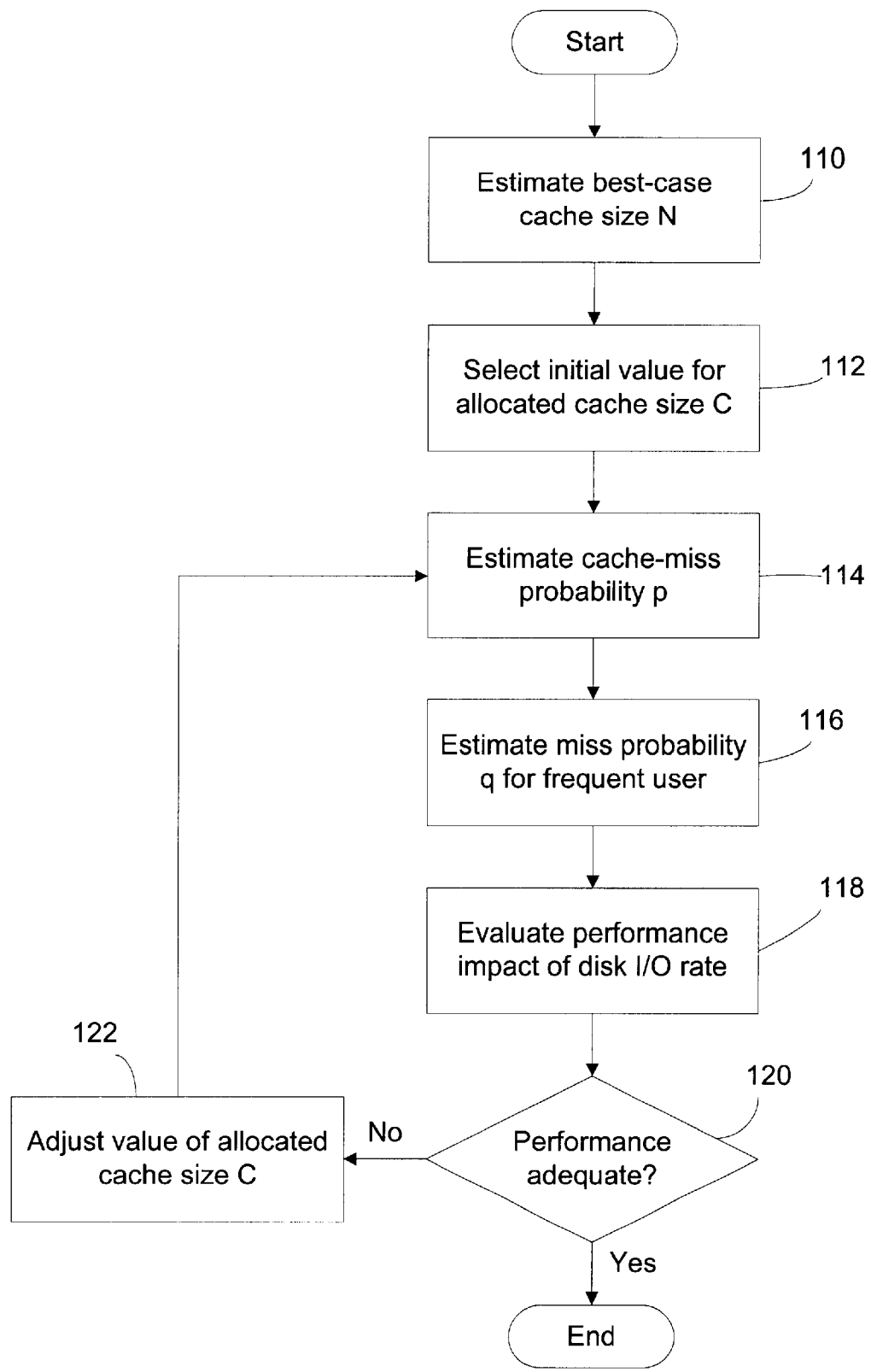
FIG. 3 is a flow diagram showing an iterative process for estimating the amount of cache memory required for a network directory service to provide adequate performance.

If it is determined that the performance of the service with the present value of the allocated cache memory size C is not adequate (step 120), the value of C is adjusted (step 122). The adjustment may be, for example, incrementing the size C by an amount that is pre-selected or determined according to the result of the performance modeling. Alternatively, if the performance modeling suggests that there is room for reduction of the cache size without unduly compromising the performance of the service, the cache size may even be reduced. The steps of estimating p and q (steps 114 and 116) and determining the performance impact for the new value of C (step 118) are then performed, and again it is determined whether the new allocated cache memory size provides adequate service performance (step 118). If the performance is still inadequate, the value of C is again adjusted (step 122). This iterative estimation process is continued until a value of the allocated cache memory size C is found to allow the directory service 96 to provide adequate performance. This amount of memory space can then be allocated to the network database service. The steps of this iterative cache size estimation process as shown in FIG. 3 are described in further detail below.

Turning now to the estimation of the best-case cache size N (step 110), it will be appreciated that N is not the overall size of the database entries stored on the disk, but rather depends on the estimated rate of queries received from the clients of the service. In an implementation for the directory service of the preferred embodiment, the estimation of the best-case cache size N and the cache-miss probability p is carried out based on a memory model described in Y. C. Tay, "How Memory Size and Memory Allocation Affect Disk Reads", Research Report No. 764, Department of Mathematics, National University of Singapore, which is hereby incorporated by reference in its entirety.

Figure 4:
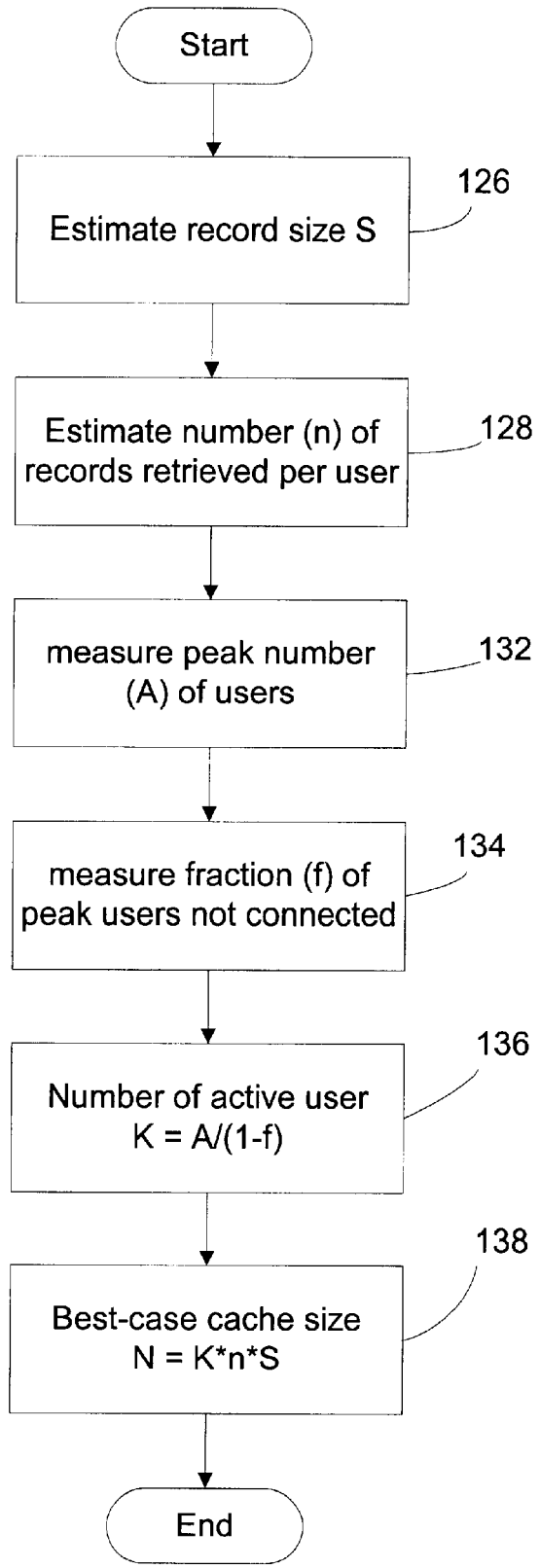
FIG. 4 is a flow diagram showing a process of estimating a best-case cache size for the directory service.

More particularly, the best-case cache size N is estimated based on the size of data retrieved for each user and the number of active users. Referring to FIG. 4, the size (S) of a retrieved database record is determined (step 126). The record size is the typical block size of I/O operations (e.g., 4K bytes). The number (n) of records retrieved for a user is also determined (step 128). The value n*S is then the amount of data retrieved for a user. It will be appreciated that both the variables n and S may be averaged quantities derived from empirical data or analytic modeling. An important assumption in this estimation process is that the value n*S can be reasonably determined as an average value that meaningfully indicate the average amount of data retrieved for a user, even though the size of the data retrieved for each user may vary.

The number (K) of active users among the clients connected to the directory service is then determined. This active user number K may be a target number for a proposed client-server system. In this case, K can be estimated by observing the operations of an existing system in the following steps. First, the peak number (A) of active user on the existing system is measured (step 132). The fraction (f) of users that arrive during the peak period but could not become active within a target time period (because the system is too slow in responding) is determined (step 134). This fraction f is also called the "latent demand" and can be measured. The number of active user is then calculated (step 136) as:

$$K=A/(1-f).$$

The best-case cache size is then calculated (step 138) as:

$$N=K*n*S.$$

After the best-case cache size N is determined, the cache-miss probability p can be determined. Ideally, with a cache of the size N, the directory service 96 will need to retrieve a record for a client query only once for the initial caching, and there is no need for disk I/O for responding to subsequent queries. In most cases, however, it is unlikely that this amount of memory will be available for the service. In other words, the allocated cache memory size C tends to be smaller than the best-case size N. It is therefore necessary to estimate the cache-miss probability p, i.e. the probability that a record is not in cache when there is a request for it. In this regard, it is to be noted that there is always a cache miss when a record is first requested. As implemented in a preferred embodiment, the estimation of p is carried out by first determining the number (R) of requests for records per user. In general, R is larger than the number n (the number of records retrieved for a user) determined in connection with estimating N. This is because two or more requests (e.g., to find and to modify) may refer to the same record, so the number of requests (R) is generally larger than the number (n) of records actually retrieved. In the memory model used in the present embodiment, the relationship between a target cache-miss probability p and the required cache size C is:

$$C=K*n*S*(1-(1-n/(p*R))^2).$$

Thus, for a given value of the allocated cache memory size C, the cache-miss probability p can be determined from the above equation as:

$$p=n/(R*(1-sqrt(1-C/(K*n*S)))).$$

Turning now to the cache-miss probability q, in a preferred embodiment, it is desirable to size the cache 96 large enough so that frequent users see better performance than the average user. In other words, even if a frequent user leaves (e.g. logs off after retrieving mail) and returns a short while later (e.g. to send replies), the requested records preferably are still in the cache. In the present embodiment, the probability q that the requested records have already been removed from the cache and therefore have to be retrieved from the database on the disk is determined in the following process.

Figure 5:
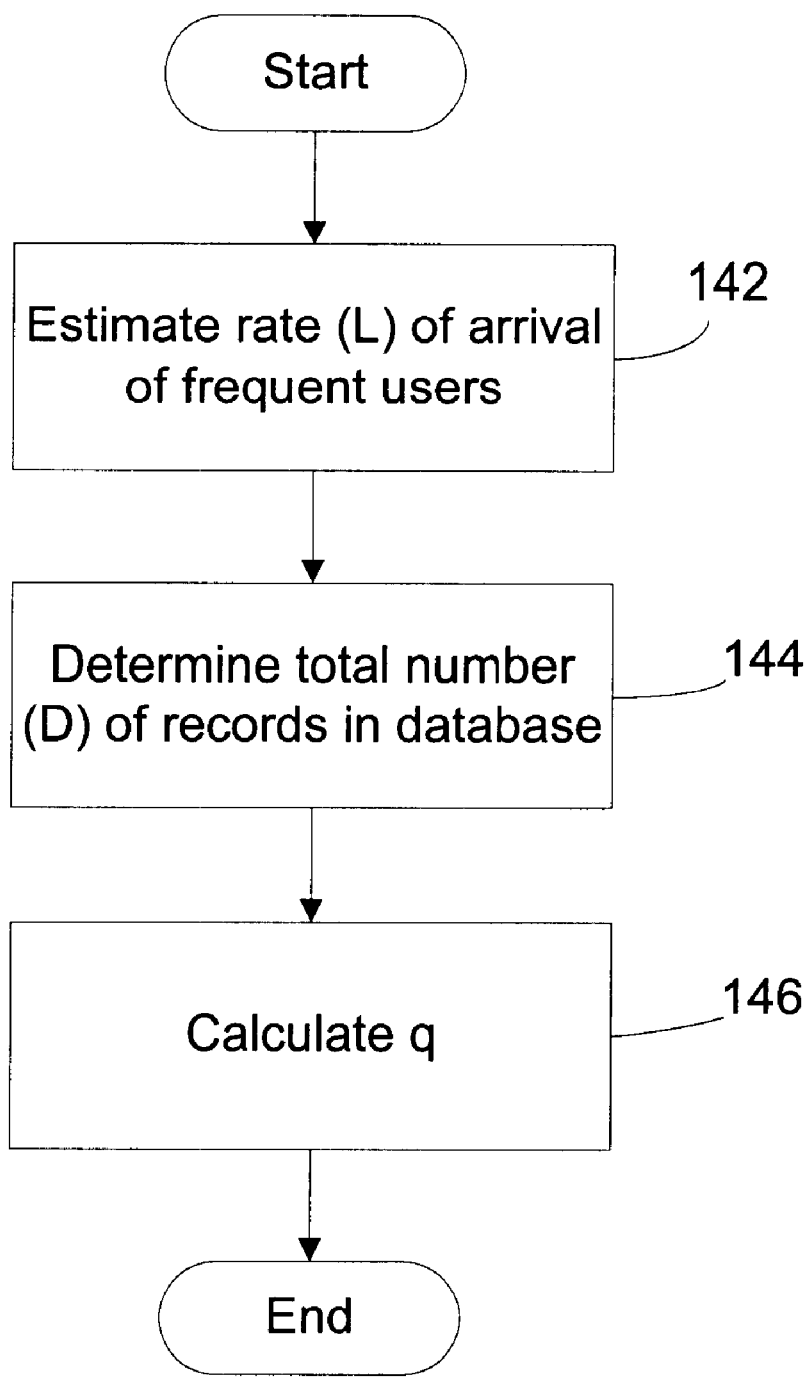
FIG. 5 is a flow diagram showing a process of estimating a cache-miss probability for the case that a database record requested by a frequent user of the directory service is not in the cache of the directory service.

Referring to FIG. 5, the rate (L) of arrival of frequent users is estimated (step 142). The total number (D) of records in the directory database is also determined (step 144). The miss probability q is then calculated (step 146). In one implementation, the probability q is estimated in the following derivation. The number of records that can fit in the cache is C/S. For a randomly arriving user, the probability that his record is already in cache is C/(S*D), which is also referred to as the cache hit probability. Therefore, the cache miss probability is 1−(C/(S*D)). With a given rate (L) of arrival of frequent users, the miss rate will then be (1−(C/(S*D)))*L. Therefore, a record in cache is replaced by a disk retrieval after every 1/((1−C/S*D)))*L) units of time. Assuming that records are approximately replaced in a first in first out ("FIFO") manner, a record will have an average residency time of $$t=C/((1-(C/S*D))*L*S)$$

Assuming a frequent user has inter-session time that is exponentially distributed with a mean T, the probability of a hit for a frequent user is $$q=1-\exp(-t/T).$$

Therefore, $$q=1-\exp(-C/((1-(C/S*D))*L*S*T),$$

which when simplified becomes $$q=1-\exp(-D*C/(L*T*(D*S-C))).$$

This equation can also be rewritten as:

$$C=D*S/(1-D/(L*T*\log(1-q))).$$

As described above, after the miss probabilities p and q are estimated for a present value of the allocated cache size C, the impact on the performance of the directory service due to the estimated disk I/O rate based P and q is evaluated. The performance impact evaluation can be based on many different criteria that are appropriate for the application and its environment and may range from simple pass/fail rules to complicated system analysis. This evaluation process may be automated by providing a suitable module that accepts the miss probabilities p and q and applies pre-programmed analysis to determine the performance impact.

By way of example, one of the common approaches to computer system modeling is called analytic modeling, which uses queuing network models. In this approach, the internal devices of a computer such as the CPU, Disk, Network controllers are represented as a center where tasks can queue up to receive service. Each task in the computer system is queued at the CPU first and subsequently queued at the various devices required for completing the task. After receiving service from the devices (i.e., network transfer or Disk I/O operation), the task is completed. Typically, these queuing network models are solved to obtain average values of device utilizations and task response times. The inputs to such a model would include, for instance:

the arrival rate of tasks to the computer system;

the average service time at each device, which may be calculated from the number of CPU cycles required for the task if the device is the CPU, and the average access time for disk I/O for the disk device;

the number of times the service of each device is required, i.e., the number of disk I/Os to be performed or the number of network transfers for each task.

With these inputs, a queuing network model can be solved to obtain the performance metrics such as average device utilizations (i.e., percentage of time the CPU or disk is busy) and average task response times. In the context of allocating cache memory for a directory service, the directory cache memory model predicts the miss probabilities for a given cache memory size. A cache miss results in a disk read operation. Therefore, in the queuing network model, the average number of disk I/Os performed will be increased and the queuing network model solved to determine if the response times and device utilizations are acceptable. If they are not acceptable, the memory size is adjusted, and the queuing network model is solved again. These steps are repeated until the response time and device utilizations are deemed to be acceptable.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A method of determining a size of cache memory for a network database service to cache data retrieved from a database on a disk, comprising the steps of:

determining a best-case cache size for the network database service;

assigning an initial value for the size of cache memory;

estimating a first probability value corresponding to a general cache-miss rate for the size of the cache memory;

deriving a second probability value corresponding to a cache-miss rate for a frequent user with the size of the cache memory;

evaluating performance of the network database service with the first and second probability values to determine whether the performance is adequate; and if the performance of the network database service is determine to be not adequate, adjusting the size of the cache memory;

repeating the steps of estimating, deriving, evaluating and adjusting until the performance of the network database service is determined to be adequate.

2. A method as in claim 1, wherein the step of determining the best-case cache size includes:

determining an average size of data retrieved for a user;

determining a peak number of active users connected to the network database service;

calculating the best-case cache size as a product of the average size of data retrieved and the peak number of active users connected.

3. A method as in claim 1, wherein the step of estimating the first probability value includes estimating a number of requests for records per user and calculating the first probability value as a function of the best-case cache size and the number of requests per user.

4. A method as in claim 1, wherein the network database service is a directory service.

5. A computer-readable medium having computer-executable instructions for performing steps for estimating a size of cache memory for a network database service, comprising:

determining a best-case cache size for the network database service;

assigning an initial value for the size of cache memory;

estimating a first probability value corresponding to a general cache-miss rate for the size of the cache memory;

deriving a second probability value corresponding to a cache-miss rate for a frequent user with the size of the cache memory;

evaluating performance of the network database service with the first and second probability values to determine whether the performance is adequate; and if the performance of the network database service is determine to be not adequate, adjusting the size of the cache memory;

repeating the steps of estimating, deriving, evaluating and adjusting until the performance of the network database service is determined to be adequate.

6. A computer-readable medium as in claim 5, wherein the network database service is a directory service.

7. A computer-readable medium as in claim 6, wherein the step of determining the best-case cache size includes:

determining an average size of data retrieved for a user;

determining a peak number of active users connected to the network database service;

calculating the best-case cache size as a product of the average size of data retrieved and the peak number of active users connected.

8. A computer-readable medium as in claim 7, wherein the step of estimating the first probability value includes estimating a number of requests for records per user and calculating the first probability value as a function of the best-case cache size and the number of requests per user.

* * * * *

UNITED STATES PATENT AND TRADEMARK OFFICE
CERTIFICATE OF CORRECTION

PATENT NO. : 6,493,810 B1
DATED : December 10, 2002
INVENTOR(S) : Pang et al.

It is certified that error appears in the above-identified patent and that said Letters Patent is hereby corrected as shown below:

Column 4,
Line 32, "device So has" should read -- device 50 has --.

Column 8,
Line 10, "$C=K*n*S*(1-(1-n/(p*R))2)$" should read -- $C=K*n*S*(1-(1-n/(p*R))^2)$ --.

Signed and Sealed this

Twenty-second Day of June, 2004

JON W. DUDAS
*Acting Director of the United States Patent and Trademark Office*